(12) United States Patent
Itaya et al.

(10) Patent No.: US 12,382,154 B2
(45) Date of Patent: Aug. 5, 2025

(54) IMAGING DEVICE

(71) Applicant: Panasonic Intellectual Property Management Co., Ltd., Osaka (JP)

(72) Inventors: Shunsuke Itaya, Osaka (JP); Yuuji Matsuo, Osaka (JP); Norikazu Kaneda, Osaka (JP); Takuya Amano, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 111 days.

(21) Appl. No.: 18/391,737

(22) Filed: Dec. 21, 2023

(65) Prior Publication Data

US 2024/0214655 A1    Jun. 27, 2024

(30) Foreign Application Priority Data

Dec. 26, 2022    (JP) ................. 2022-208597

(51) Int. Cl.
*H04N 23/52* (2023.01)
*H04N 23/68* (2023.01)

(52) U.S. Cl.
CPC ............. *H04N 23/52* (2023.01); *H04N 23/68* (2023.01)

(58) Field of Classification Search
CPC ......... H04N 23/52; H04N 23/68; H04N 23/54
See application file for complete search history.

(56) References Cited

U.S. PATENT DOCUMENTS 10,766,431 B2 *    9/2020    Koshiba ................. H04N 23/51

FOREIGN PATENT DOCUMENTS

| EP | 3599493 A2 * | 1/2020 | ............. G02B 7/008 |
| JP | 2004-104632 A | 4/2004 | |
| JP | 2011-120065 A | 6/2011 | |
| JP | 2012-047887 A | 3/2012 | |
| JP | 2014045304 A * | 3/2014 | ........... H04N 5/2253 |
| WO | WO-2020230745 A1 * | 11/2020 | ........... G02B 27/017 |

* cited by examiner

*Primary Examiner* — Timothy J Henn
(74) *Attorney, Agent, or Firm* — Renner, Otto, Boisselle & Sklar, LLP

(57) ABSTRACT

An imaging device includes a housing, an imaging module disposed in the housing and including an imaging element, and a heat conductive sheet including a first end portion in contact with the imaging module and a second end portion in contact with an inner surface of the housing. An intermediate portion between the first end portion and the second end portion of the heat conductive sheet is curved outward convexly and is in contact with a portion of the inner surface of the housing.

6 Claims, 5 Drawing Sheets

IMAGING DEVICE

BACKGROUND OF THE INVENTION

Field of the Invention

The present disclosure relates to an imaging device.

Description of the Related Art

JP2011-120065A discloses a heat dissipation structure in which an imaging element package and a housing are thermally connected via a heat conductive sheet. Both end portions of the heat conductive sheet are in contact with the housing, and an intermediate portion of the heat conductive sheet is in contact with the imaging element package.

SUMMARY OF THE INVENTION

An object of the present disclosure is to further improve heat dissipation in an imaging device in which heat generated from an imaging element that is a heat source is transferred to a housing that is a heat dissipation member via a heat conductive sheet.

In order to solve the above problem, according to one aspect of the present disclosure, provided is an imaging device including:

a housing;
an imaging module disposed in the housing and including an imaging element; and
a heat conductive sheet including a first end portion in contact with the imaging module and a second end portion in contact with an inner surface of the housing,
in which an intermediate portion between the first end portion and the second end portion of the heat conductive sheet is curved outward convexly and is in contact with a portion of the inner surface of the housing.

According to the present disclosure, heat dissipation can be further enhanced in an imaging device in which heat generated from an imaging element that is a heat source is transferred to a housing that is a heat dissipation member via a heat conductive sheet.

DESCRIPTION OF THE PREFERRED EMBODIMENTS

In the following, an embodiment will be described in detail with reference to the drawings as appropriate. However, unnecessarily detailed descriptions will be omitted in some cases. For example, detailed descriptions of already well-known matters and repetition of descriptions of substantially the same configuration will be omitted in some cases. This is to prevent the following description from being unnecessary redundant and to facilitate those skilled in the art to understand the present disclosure.

Note that the inventors provide the accompanying drawings and the following description in order for those skilled in the art to fully understand the present disclosure, and does not intend to limit the subject matter described in the claims by the accompanying drawings and the following description.

Hereinafter, an imaging device according to an embodiment of the present disclosure will be described with reference to the drawings.

Figure 1:
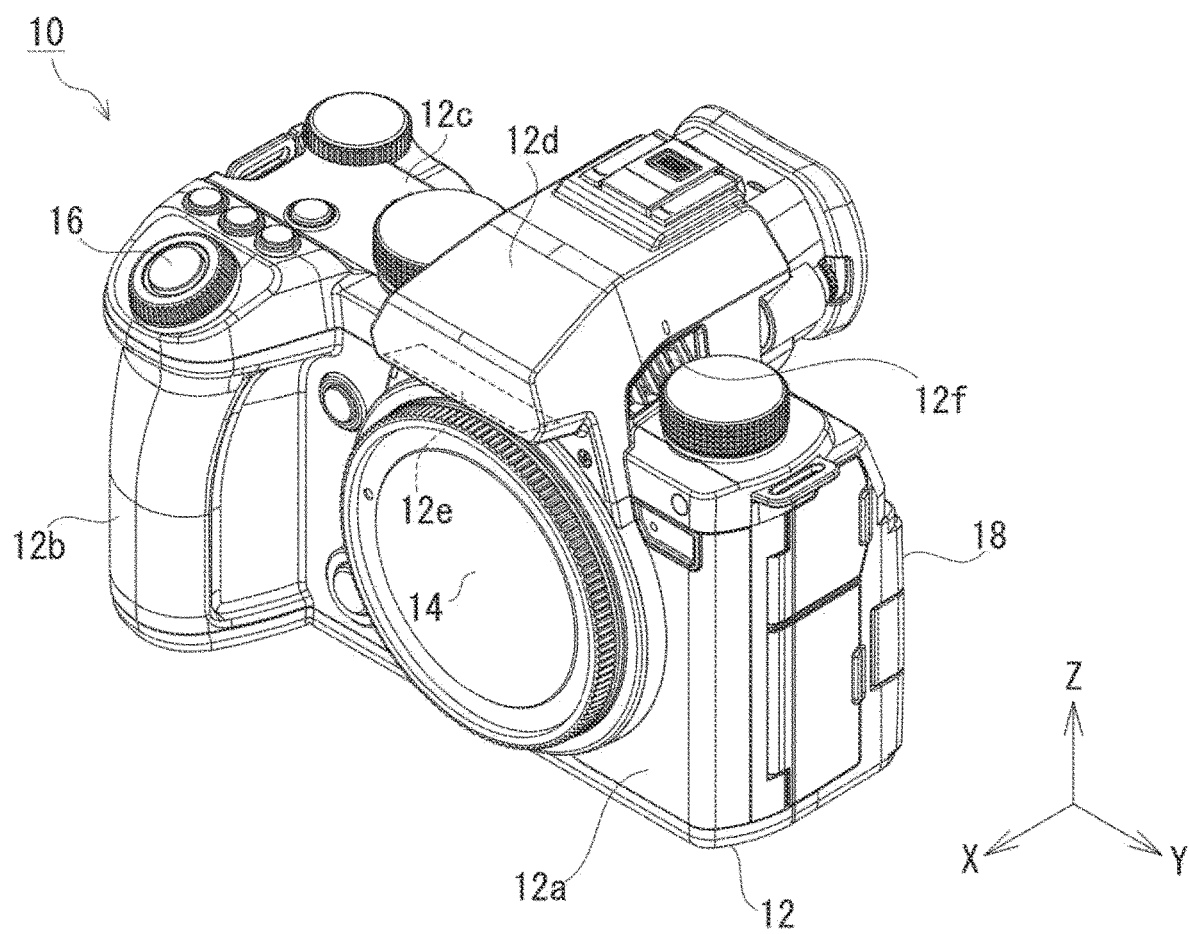
FIG. 1 is a perspective view of an imaging device according to an embodiment of the present disclosure.

FIG. 1 is a perspective view of an imaging device according to an embodiment of the present disclosure. Furthermore, FIG. 2 is an exploded perspective view of the imaging device according to the embodiment of the present disclosure.

Here, an X-Y-Z orthogonal coordinate system illustrated in the drawings is for facilitating understanding of the embodiment of the present disclosure, and does not limit the embodiment of the present disclosure. An X-axis direction is a front-rear direction of the imaging device, a Y-axis direction is a left-right direction, and a Z-axis direction is a height direction. Furthermore, a side on which a subject is present at the time of capturing an image is defined as a front side of the imaging device. Moreover, the "left-right direction" in the present specification is a left-right direction in a case where a front surface of the imaging device is viewed from the front of the imaging device.

Figure 2:
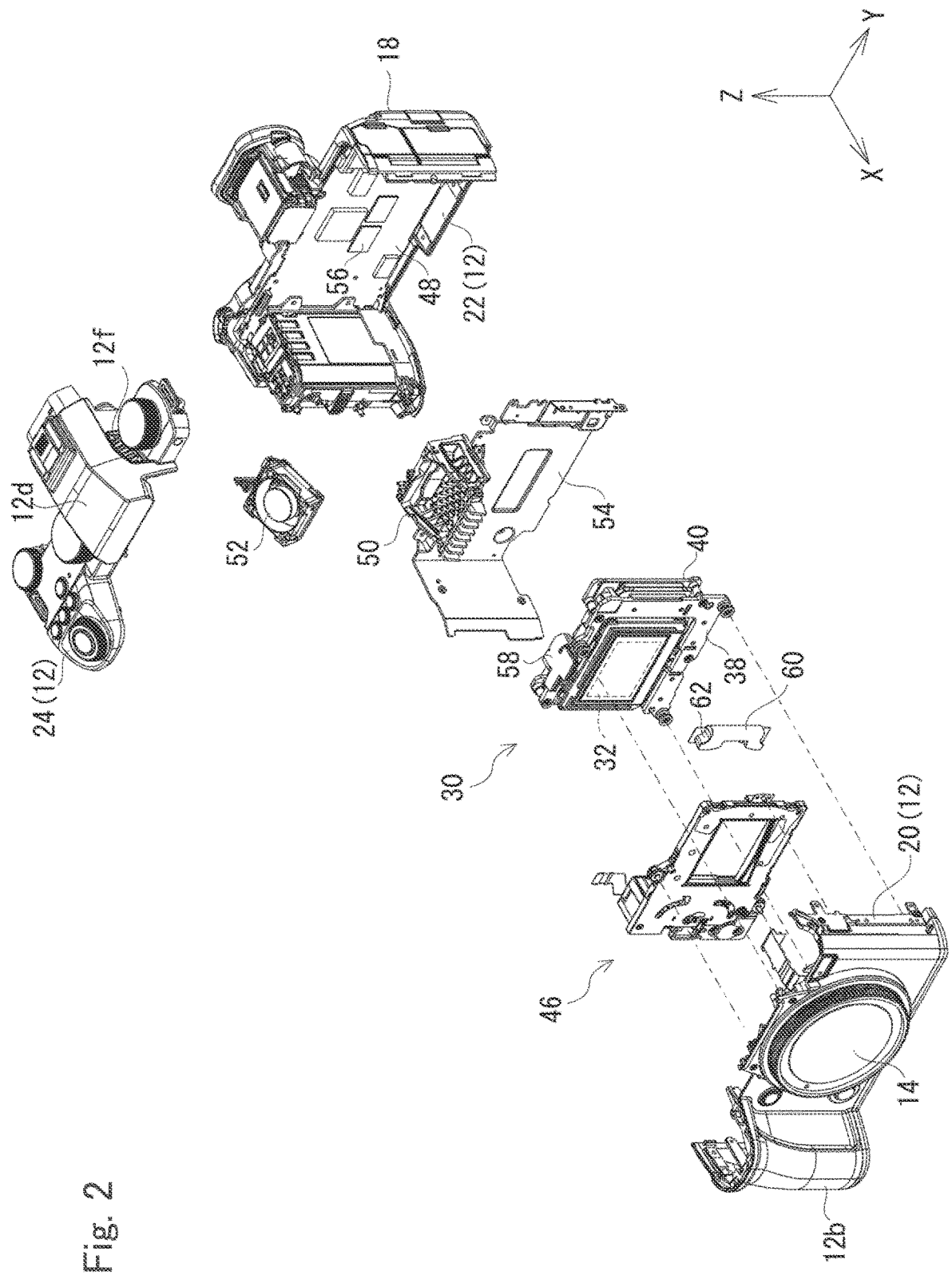
FIG. 2 is an exploded perspective view of the imaging device according to the embodiment of the present disclosure.

As illustrated in FIGS. 1 and 2, an imaging device 10 according to the present embodiment is a so-called digital camera.

Specifically, the imaging device 10 includes a housing 12. A lens mount (not illustrated) to which a lens is attached is provided on a front surface 12a of the housing 12. Note that the drawings illustrate a state in which a lens cap 14 is attached to the lens mount.

A grip portion 12b gripped by a user is provided on the left side of the housing 12. A shutter button 16 is provided on an upper surface of the grip portion 12b. Moreover, a vari-angle monitor 18 is provided on a rear surface of the housing 12.

Note that, in the present embodiment, the housing 12 includes a front casing 20, a rear casing 22, and a top casing 24 made of a metal material. The front casing 20 is a front portion of the housing 12 and includes the front surface 12a of the housing 12. The rear casing 22 is a rear portion of the housing 12 and includes a rear surface of the housing 12. The top casing 24 is an upper portion of the housing 12 and includes an upper surface 12c of the housing 12.

As illustrated in FIG. 2, an imaging module 30 is disposed in the housing 12.

Figure 3:
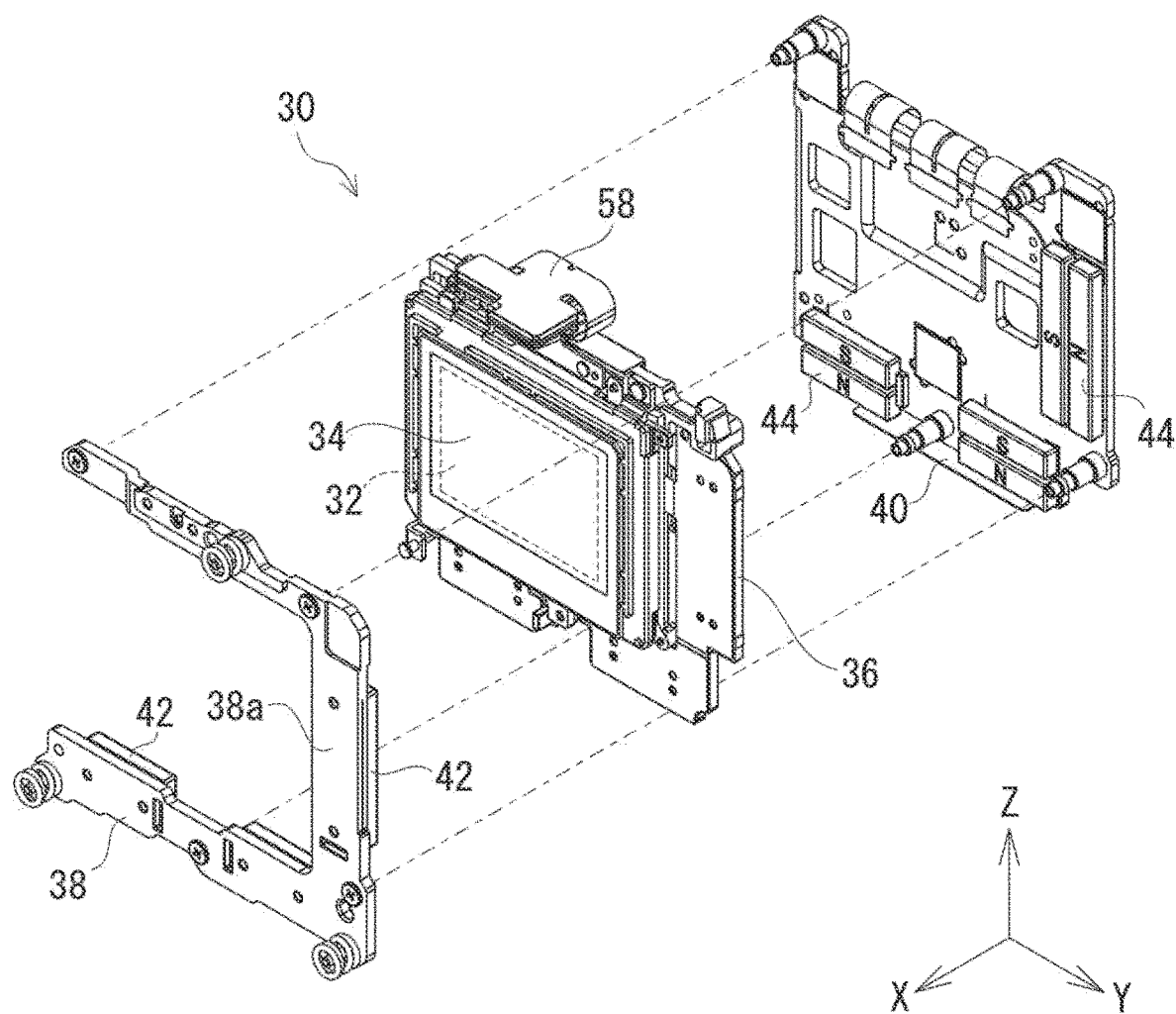
FIG. 3 is an exploded perspective view of an imaging module according to the embodiment of the present disclosure.

FIG. 3 is an exploded perspective view of the imaging module according to the embodiment of the present disclosure.

As illustrated in FIGS. 2 and 3, the imaging module 30 includes an imaging element 32. The imaging element 32 is a device that receives an image (image light) of a subject transmitted through a lens attached to the lens mount on a light receiving surface and converts the received image light into an electric signal. Note that the imaging element 32 is covered and protected by a protective glass 34.

In the present embodiment, the imaging module 30 includes an image stabilizer. The image stabilizer is a mechanism that displaces the imaging element 32 in a direction (that is, the left-right direction (Y-axis direction) and the height direction (Z-axis direction)) orthogonal to an extending direction of an optical axis of the imaging device 10 (that is, the front-rear direction (X-axis direction)) so that image blurring does not occur due to vibration of the hand of the user holding the imaging device 10.

Specifically, the imaging module 30 includes a movable frame 36 that supports the imaging element 32, and a front frame 38 and a rear frame 40 that movably support the movable frame 36 in the left-right direction (Y-axis direction) and the height direction (Z-axis direction). Note that the imaging module 30 is fixed to a front portion (in the present embodiment, the front casing 20) of an inner surface of the housing 12, which is a back side portion of the front surface 12a of the housing 12, via the front frame 38 with screws or the like.

The front frame 38 and the rear frame 40 are fixed to each other, and support the movable frame 36 such that the movable frame 36 is displaced between the front frame and the rear frame. In order to displace the movable frame 36, a plurality of magnets 42 and 44 are provided on the front frame 38 and the rear frame 40, respectively. Furthermore, a plurality of coils (not illustrated) is provided in a portion of the movable frame 36 located between the plurality of magnets 42 and 44. When a current flows through the coil, the coil is displaced in a magnetic field formed between the magnets 42 and 44, As a result, the movable frame 36 is displaced.

As illustrated in FIG. 2, a shutter module 46 is disposed in front of the imaging module 30 in the housing 12. The shutter module 46 includes a shutter for adjusting an exposure time. Furthermore, in the housing 12, a circuit board 48 is disposed behind the imaging module 30. The circuit board 48 is a control board that controls the vari-angle monitor 18, the imaging module 30, the shutter module 46, and the like.

Furthermore, the imaging device 10 includes several heat sources and several heat dissipation paths for discharging heat generated from the heat sources to the outside.

As illustrated in FIG. 2, in the case of the present embodiment, the imaging device 10 includes a heat sink 50 that is a heat dissipation member, and a fan 52 that cools the heat sink 50 in the housing 12. The heat sink 50 is made of a material having a high thermal conductivity. In a state where the fan 52 is placed on the heat sink 50, the heat sink 50 and the fan 52 are stored in a protrusion 12d (in the present embodiment, the top casing 24) protruding from a central portion of the upper surface 12c of the housing 12. Therefore, as illustrated in FIG. 1, an intake port 12e is provided on a bottom surface of a front end of the protrusion 12d, and exhaust ports 12f are provided on both side surfaces of the protrusion 12d in the left-right direction (Y-axis direction). When the fan 52 rotates, air flows into the protrusion 12d via the intake port 12e, cools the heat sink 50, and flows out of the protrusion 12d via the exhaust ports 12f.

In the case of the present embodiment, a heat transfer plate 54 attached to and in contact with the heat sink 50 and thereby thermally connected to the heat sink 50 is provided in the housing 12. The heat transfer plate 54 is made of a metal material having a high thermal conductivity.

The heat transfer plate 54 is disposed between the imaging module 30 and the circuit board 48. Furthermore, the heat transfer plate 54 is in contact with mounted component 56 such as an IC chip as a heat source mounted on the circuit board 48 via a high thermal conductivity heat dissipation material (not illustrated) such as silicone rubber, and absorbs heat of the mounted component 56. As a result, heat generated from the mounted component 56 is transferred to the heat sink 50 via the heat transfer plate 54.

Furthermore, in the case of the present embodiment, the movable frame 36 in the imaging module 30 is thermally connected to the heat sink 50. Specifically, as illustrated in FIGS. 2 and 3, the movable frame 36 is provided with a loop-shaped heat conductive sheet 58. The heat conductive sheet 58 is a sheet having flexibility and a high thermal conductivity. The heat conductive sheet 58 is, for example, a graphite sheet. By fixing the loop-shaped heat conductive sheet 58 to a lower surface of the heat sink 50, the movable frame 36 is thermally connected to the heat sink 50 via the loop-shaped heat conductive sheet 58. As a result, heat generated from the imaging element 32 as a heat source is transferred to the heat sink 50 via the movable frame 36 and the heat conductive sheet 58.

Moreover, the housing 12 and the imaging module 30 are thermally connected.

Figure 4:
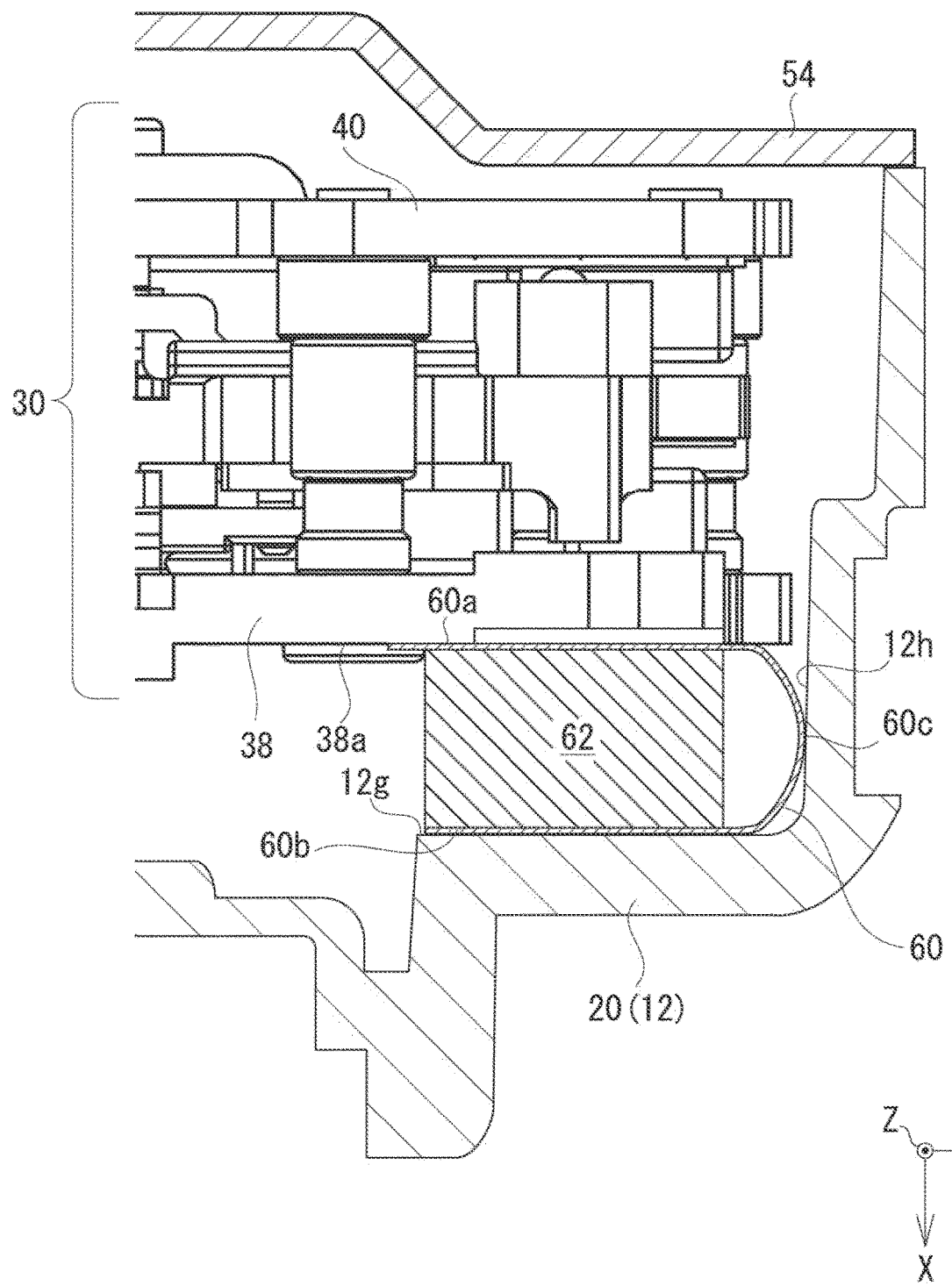
FIG. 4 is a partial cross-sectional view illustrating thermal connection between a housing and the imaging module.

FIG. 4 is a partial cross-sectional view illustrating thermal connection between the housing and the imaging module.

As illustrated in FIGS. 2 and 4, a heat conductive sheet 60 is disposed between the housing 12 and the imaging module 30. The heat conductive sheet 60 is a sheet having flexibility and a high thermal conductivity. The heat conductive sheet 60 is, for example, a graphite sheet. In the case of the present embodiment, the heat conductive sheet 60 is disposed in a right side portion of the housing 12.

The heat conductive sheet 60 includes a first end portion 60a that contacts a front surface 38a (in the present embodiment, a front surface 38a of the front frame 38) of the imaging module 30, and a second end portion 60b that contacts a front portion 12g (in the present embodiment, a portion 12g of a back surface of the front casing 20) of the inner surface of the housing 12.

Furthermore, in the case of the present embodiment, the first end portion 60a and the second end portion 60b of the heat conductive sheet 60 face each other with a space between the first end portion and the second end portion in the front-rear direction (X-axis direction). Moreover, an intermediate portion 60c of the heat conductive sheet 60 between the first end portion 60a and the second end portion 60b is curved outward (in the case of the present embodiment, the right side) convexly in the left-right direction (Y-axis direction).

In the case of the present embodiment, an elastic member 62 is disposed between the first end portion 60a and the second end portion 60b of the heat conductive sheet 60. The elastic member 62 is a member made of an elastic material such as foamed urethane.

In the case of the present embodiment, the first end portion 60a and the second end portion 60b of the heat conductive sheet 60 are fixed to the elastic member 62 via an adhesive member (not illustrated) such as a double-sided tape. Furthermore, the first end portion 60a of the heat conductive sheet 60 is fixed to the front surface 38a of the front frame 38 of the imaging module 30 via an adhesive member (not illustrated) such as a double-sided tape. This is to improve the assemblability of the imaging device 10.

Figure 5:
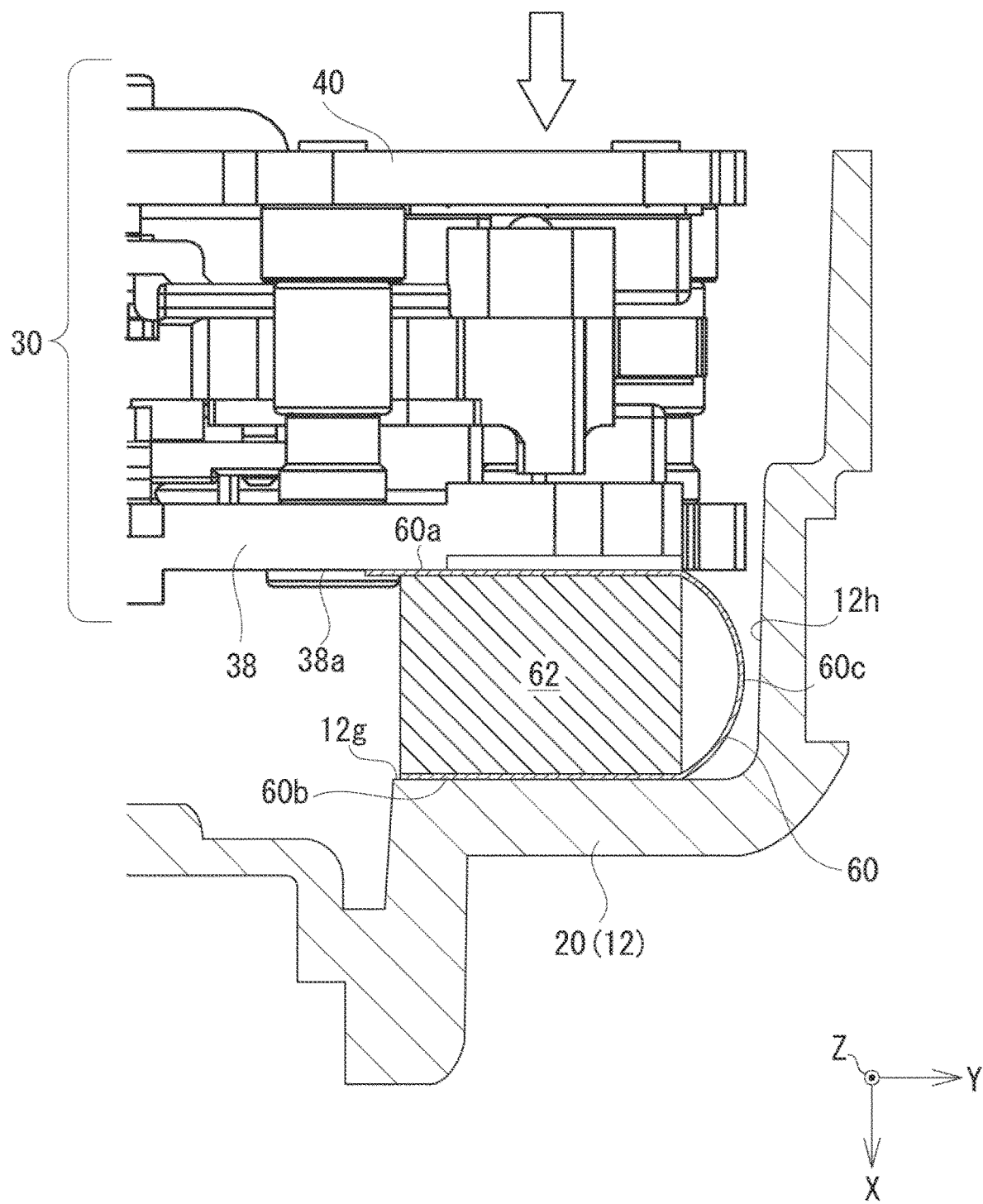
FIG. 5 is a partial cross-sectional view illustrating a state immediately before the imaging module is attached to the housing.

FIG. 5 is a partial cross-sectional view illustrating a state immediately before the imaging module is attached to the housing.

As described above, the imaging module 30 is fixed to the housing 12 (in the present embodiment, the front casing 20) through the front frame 38 via screws or the like. At the time of fixing, the imaging module 30 is brought close to the front casing 20 in the front-rear direction (X-axis direction). When the imaging module 30 approaches the front casing 20, the second end portion 60b of the heat conductive sheet 60 contacts the portion 12g of the back surface of the front casing 20. Note that, at this contact timing, the intermediate portion 60c of the heat conductive sheet 60 is not in contact with the front casing 20.

From the timing when the second end portion 60b of the heat conductive sheet 60 comes into contact with the front casing 20, the imaging module 30 is further brought close to the front casing 20, and then the imaging module 30 is fixed to the front casing 20. As a result, as illustrated in FIG. 4, the elastic member 62 is compressed in the front-rear direction (X-axis direction), and the first end portion 60a and the second end portion 60b of the heat conductive sheet 60 approach each other in the front-rear direction. As a result, the intermediate portion 60c of the heat conductive sheet 60 is curved outward in the left-right direction (Y-axis direction) more sharply and convexly than before the second end portion 60b comes into contact with the front casing 20. As a result, the intermediate portion 60c of the heat conductive sheet 60 continues to contact a portion 12h of the inner surface of the housing 12 (in the case of the present embodiment, a right side portion 12h of the inner surface of the housing 12). Furthermore, the elastic member 62 biases the first end portion 60a toward the front frame 38 of the imaging module 30 and biases the second end portion 60b toward the front casing 20. As a result, the first end portion 60a of the heat conductive sheet 60 continues to be in contact with the front frame 38 of the imaging module 30, and the second end portion 60b continues to be in contact with the front casing 20.

According to such a heat conductive sheet 60, heat of the imaging module 30 that has become a high temperature state due to heat generated by the imaging element 32 is transferred from the front frame 38 to the heat conductive sheet 60 via the first end portion 60a. The heat of the heat conductive sheet 60 is transferred to the front casing 20 of the housing 12 via the second end portion 60b and the intermediate portion 60c. Then, the heat is dissipated from the front casing 20 to the outside.

Since the intermediate portion 60c of the heat conductive sheet 60 between the first end portion 60a in contact with the imaging module 30 as a heat source and the second end portion 60b in contact with the front casing 20 of the housing 12 as a heat dissipation member comes into contact with the front casing 20, heat dissipation is improved. That is, a contact area between the heat conductive sheet 60 and the front casing 20 of the housing 12 increases. As a result, heat dissipation from the imaging module 30 to the housing 12 is further improved as compared with a case where the intermediate portion 60c of the heat conductive sheet 60 is not in contact with anything.

Furthermore, in the case of the present embodiment, the intermediate portion 60c of the heat conductive sheet 60 is in contact with the right side portion 12h of the inner surface of the housing 12. That is, the intermediate portion 60c of the heat conductive sheet 60 is not in contact with a left side portion of the inner surface of the housing 12 which is a back side of the grip portion 12b. Therefore, heat is not transferred to the hand of a user who grips the grip portion 12b, and it is possible to suppress discomfort to the user.

Moreover, in the case of the present embodiment, as described above, the second end portion 60b and the intermediate portion 60c of the heat conductive sheet 60 are in contact with the front casing 20 of the housing 12, but are not fixed. Therefore, maintainability of the imaging device 10 is improved. That is, the imaging module 30 can be removed from the front casing 20 of the housing 12 without destroying the heat conductive sheet 60.

Note that, in the case of the present embodiment, as illustrated in FIG. 4, a right side end of the heat transfer plate 54 is in contact with the front casing 20 of the housing 12. Therefore, a part of the heat transferred to the front casing 20 via the heat conductive sheet 60 is transferred to the heat transfer plate 54. As described above, the heat transfer plate 54 is thermally connected to the heat sink 50 cooled by the fan 52. Therefore, the heat dissipation from the heat conductive sheet 60 to the housing 12 is further improved.

According to the present embodiment as described above, heat dissipation can be further enhanced in the imaging device 10 in which heat generated from the imaging element 32 as a heat source is transferred to the housing 12 as a heat dissipation member via the heat conductive sheet 60.

Although the embodiment of the present disclosure has been described above with reference to the above-described embodiment, the embodiment of the present disclosure is not limited to the above-described embodiment.

For example, in the case of the above-described embodiment, the heat conductive sheet 60 illustrated in FIGS. 4 and 5 is a graphite sheet having flexibility. However, the embodiment of the present disclosure is not limited to this. For example, the heat conductive sheet 60 may be made of an elastically deformable metal material. The heat conductive sheet 60 may be, for example, an aluminum sheet. Note that, in a case where the contact between the first end portion 60a and the imaging module 30 and the contact between the second end portion 60b and the housing 12 can be maintained by the elastic deformation (restoring force) of the heat conductive sheet 60, the elastic member 62 can be omitted. Furthermore, in this case, the first end portion 60a and the second end portion 60b of the heat conductive sheet 60 may not face each other in the front-rear direction (X-axis direction).

That is, in a broad sense, the imaging device according to the embodiment of the present disclosure includes: a housing; an imaging module disposed in the housing and including an imaging element; and a heat conductive sheet including a first end portion in contact with the imaging module and a second end portion in contact with an inner surface of the housing, in which an intermediate portion between the first end portion and the second end portion of the heat conductive sheet is curved outward convexly and is in contact with a portion of the inner surface of the housing.

As described above, the above-described embodiment has been described as an example of the technique in the present disclosure. To that end, the drawings and detailed description are provided. Therefore, the components described in the drawings and the detailed description may include not only components essential for solving the problem but also components that are not essential for solving the problem in order to illustrate the above-described technique. Therefore, it should not be immediately recognized that these non-essential components are essential based on the fact that these non-essential components are described in the drawings and the detailed description.

Furthermore, since the above-described embodiment is intended to illustrate the technique in the present disclosure, various changes, replacements, additions, omissions, and the like can be made within the scope of the claims or equivalents thereof.

The present disclosure is applicable to an imaging device including an imaging element.

What is claimed is:
1. An imaging device comprising:
a housing;

an imaging module disposed in the housing and including an imaging element; and a heat conductive sheet including a first end portion, which is in contact with the imaging module, and a second end portion, which is in contact with an inner surface of the housing, wherein an intermediate portion between the first end portion and the second end portion of the heat conductive sheet is curved outward convexly and is in contact with a portion of the inner surface of the housing.

2. The imaging device according to claim 1, wherein the housing includes a grip portion gripped by a user, and the intermediate portion of the heat conductive sheet is in contact with the inner surface of the housing at a position different from the grip portion.

3. The imaging device according to claim 2, further comprising:

a heat transfer plate disposed in the housing;

a heat sink disposed in the housing and in contact with the heat transfer plate; and a fan that is disposed in the housing and cools the heat sink, wherein the heat transfer plate is in contact with the inner surface of the housing.

4. The imaging device according to claim 1, further comprising an elastic member disposed between the first end portion and the second end portion of the heat conductive sheet, the first end portion and the second end portion of the heat conductive sheet facing each other with a space between the first end portion and the second end portion, wherein the elastic member biases the second end portion of the heat conductive sheet toward the housing while biasing the first end portion of the heat conductive sheet toward the imaging module.

5. The imaging device according to claim 1, wherein the imaging module includes an image stabilizer that displaces the imaging element in a left-right direction and a height direction.

6. The imaging device according to claim 1, wherein the heat conductive sheet is a graphite sheet.

* * * * *